Jan. 17, 1967  E. F. STOVER  3,298,230
VANE TYPE FLOW METER
Filed Oct. 28, 1963  2 Sheets-Sheet 1
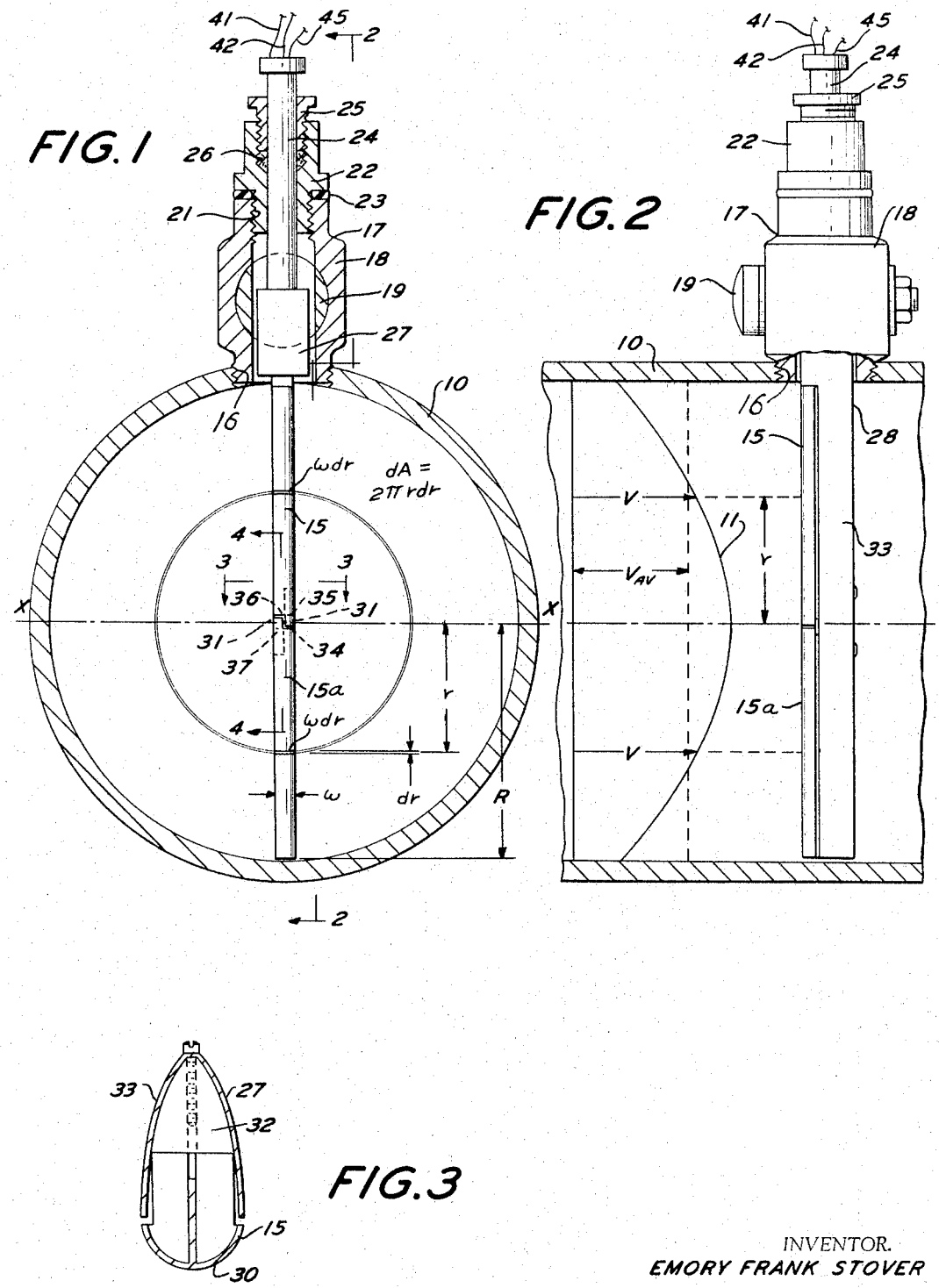
INVENTOR.
EMORY FRANK STOVER
BY
ATTORNEY Jan. 17, 1967   E. F. STOVER   3,298,230
VANE TYPE FLOW METER Filed Oct. 28, 1963   2 Sheets-Sheet 2

INVENTOR.
EMORY FRANK STOVER
BY
ATTORNEY

United States Patent Office 3,298,230
Patented Jan. 17, 1967

3,298,230
VANE TYPE FLOW METER
Emory Frank Stover, 1224 Lafayette Road,
Gladwyne, Pa. 19035
Filed Oct. 28, 1963, Ser. No. 319,278
3 Claims. (Cl. 73—228)

This invention relates to vane type flow meters and more particularly to a meter of this type which takes into account the variation of velocity across the pipe section in which the vane is located.

In the metering of fluids, a common practice is to introduce a contraction in the pipe or channel to cause an increase in the fluid velocity as in the venturi, flow nozzle, or orifice meter. The increase in velocity energy thus produced results in a decrease in pressure, which is used as a measure of fluid flow.

It has been well established that the coefficients of such devices vary in value with variations in the velocity distribution across the pipe section. This distribution is effected by upstream pipe conditions such as elbows or T's in the line, partially closed valves, temperature changes, and changes in pipe wall roughness.

It has been proposed to provide a sensing vane positioned in the flow path of a fluid. Some of these vanes as proposed create great interference with the flow and cause large pressure losses. Others of these have serious defects in their lack of proper response to flow pattern variations.

It is the principal object of the present invention to provide a flow meter of the vane type which takes into account the variation of velocity across the pipe section in which the vane is mounted and assigns to each velocity of a weight proportional to the area represented by that velocity without regard to the radius at which it may occur or without regard to change of position due to pipe incrustation, pipe bends, partly closed valves, or other causes.

It is a further object of the present invention to provide a vane type flow meter having a minimum of head loss.

It is a further object of the present invention to provide a flow meter for mounting in a pipe which may be removed from the pipe quickly for cleaning without shutting off the flow or wasting fluid, such removability being important in the metering of sewage, slurrys, and the like.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical sectional view through a pipe having the flow meter of the present invention mounted therein;

FIG. 2 is a vertical sectional view taken approximately on the line 2—2 of FIG. 1;

FIG. 3 is a horizontal sectional view, enlarged, taken approximately on the line 3—3 of FIG. 1;

Figure 4:
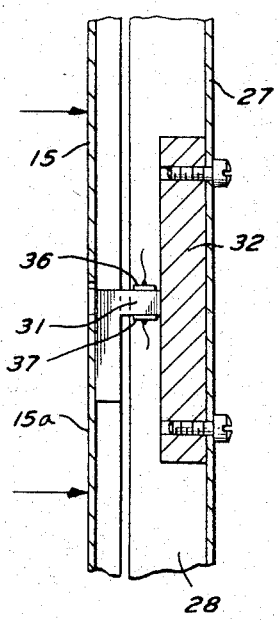
FIG. 4 is a fragmentary vertical sectional view, enlarged, taken approximately on the line 4—4 of FIG. 1.

It should, of course, be understood that the description and drawings herein are illustrative merely and that various modifications and changes can be made in the structure disclosed without departing from the spirit of the invention.

Like numerals refer to like parts throughout the several views.

The present invention is included within the general class of meters known as vane meters in which a member is extended into a moving stream of fluid so that the moving fluid exerts a force on the member. This force is then interpreted in some fashion as being a measure of the rate of flow. In general the force exerted by the fluid on the member is given by the drag equation:

$$F = AC_D \rho \frac{V^2}{2}$$

in which A is the area of the member at right angles to the velocity V, $C_D$ is a drag coefficient which is a function of Reynolds' Number, and $\rho$ is the specific mass of the fluid.

The usual hydraulic statement of the equation of continuity for pipe flow is:

$$q = AV$$

in which $q$ is the discharge in cubic units per second, A is the cross sectional area of the pipe at right angles to the pipe axis, and V is the average velocity over this area. This equation is valid even though the velocity distribution over the area is not uniform so long as the average velocity is known. However, the previously available flow meters even though calibrated, show errors in measuring $q$ unless the velocity distribution over the section remains the same as during calibration. Velocity distribution may vary for many reasons already stated. Consequently a vane meter to be reliable under varying pipe conditions must be able to relate any velocity felt by it to the portion of the pipe area over which this velocity exists. The vane type meters heretofore available did not take this into account.

In FIGS. 1 and 2 of the drawings, the cross section and axial section of a circular pipe 10 are represented, filled with fluid flowing with a curved velocity front 11 in which the variable velocity V at radius $r$ is some function of $r$, so that $$V = f(r)$$

If V is the velocity at radius $r$ then the element of discharge $dq$ through the element of area $dA$ is $VdA$, or $$dq = VdA$$

But the element of area $dA$ is $2\pi rdr$, and $V = f(r)$
Therefore:

$$dq = 2\pi f(r) rdr = kf(r) rdr$$

The apparatus in accordance with the present invention responds to velocities at different radii and has these responses weighted in proportion to the area in which these velocities exist. This is attained by providing a vane 15 or vanes 15, 15a, of constant widths, hinged or elastically mounted at the center of the pipe 10 and extending along a radius. Since in FIG. 1, $dA$ is a linear function of $r$ and the moment of the force produced by the flow through this area is to be used as a measure of this flow, then the moment should be a linear function of $r$. This is accomplished by having the origin of the moment arm at the center of the pipe 10. If all velocity fronts were flat, the location of the moment center would be unimportant. In practice, velocity fronts never are flat. If a shift from a flat front to a parabolic front with zero wall velocity and with the same discharge is considered it can be shown that the error is 18% for the consrtuction herein disclosed, and 46% for a single vane hinged at the wall of the pipe 10.

If the velocity front were identical in every axial plane one radial vane would be enough. Velocity fronts are frequently unsymmetrical, hence it is advisable to have two vanes such as the vanes 15 and 15a along that diameter which lies in the axial plane in which the maximum lack of symmetry appears. Two such vanes, 15 and 15a are effective in averaging out the lack of symmetry.

In FIG. 1 the vanes or sensing elements 15 and 15a are shown hinged elastically about the $x$—$x$ axis. The element of area $wdr$ is subjected to velocity V which produces a force $dF$ on this element equal to:

$$dF = C_D \rho V^2 w dr_2$$

Since $V^2 = f^2(r)$, $dF = k_1 f^2(r) dr$

The moment of this force axis $x$-$x'$ is equal to $$dM = k_1 f^2(r) r dr$$

The ratio of differential discharge to differential moment is $$\frac{dq}{dM} = \frac{kf(r) r dr}{k_1 f^2(r) r dr} = k_2 \frac{f(r) r dr}{f^2(r) r dr}$$

This indicates that a simple relation exists between differential discharge and differential moment because of the geometry of the sensing elements in relation to the pipe section. It is not possible to take the square roots of all differential moments before integration. The ratio of total discharge to total moment can be expressed as $$\frac{q}{M} = \frac{k \int_0^R f(r) r dr}{k_1 \int_0^{R^2} f(r) r dr}$$

and $$\frac{q}{\sqrt{M}} = k_3 \frac{\int_0^R f(r) r dr}{\sqrt{\int_0^R f^2(r) r dr}}$$

Analysis of numerous velocity profiles from actual pipes shows that the ratio between the square root of the integral and the integral of the square root is constant within the limits required for good metering.

Figure 5:
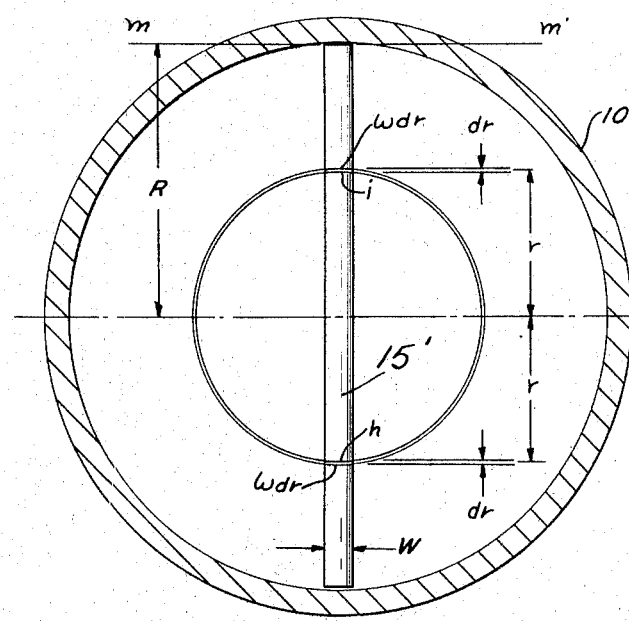
FIG. 5 is a vertical sectional view for purposes of explanation of a vane with a mounting exteriorly of the pipe.

As an example of the failure of prior vane meters to meet the conditions of pipe flow, reference may be had to FIG. 5. In this a single vane 15′ of constant width $w$ is hinged about a tangent line $m$–$m'$. The velocity V existing at radius $r$ strikes the vane 15′ at two points $h$ and $i$, producing on each a force $$dF = wdr \rho C_D \frac{V^2}{2} = k_4 V^2 dr$$

The combined moments of these two forces about axis $m$–$m'$ would be:

$$dM = k_4 V^2 dr [(R + r) + (R - r)] = 2 k_4 V^2 R dr$$

Thus the variable radius $r$ is eliminated, which is the only dimension capable of giving proper weight to the force at that radius, and every differential force is multiplied instead by the constant pipe radius R. The velocity along the pipe wall of the pipe 10 at the line $m$–$m'$ has no weight in the total moment while that at the free end of the vane 15′ the high velocity, which accounts for most of front be unsymmetrical with the high velocity near the hinge line $m$–$m'$ and the low velocity at the free end of the vane 15′ the high velocity, which accounts for most of the discharge, would be ignored and the low velocity given undue importance. Since, in turbulent flow, the velocity distribution and asymmetry are continually shifting, a vane 15′ with a tangent moment axis, even with a constant width $w$ could not interpret the flow correctly.

In the case of extreme distortion of the velocity front 11 two sensing units can be placed along two diameters at right angles to each other but displaced slightly along the pipe axis.

Referring to the structure in FIGS. 1 and 2, the total moment at the hinge axis $x$–$x'$ is used to produce a signal external to the pipe 10 and means are provided for taking the square root of this signal so that the result can be used as a measure of the rate of flow, $q$. A most convenient device for producing the signal is a resistance strain gauge.

In FIGS. 1 to 4, and 6, a preferred form of construction is there illustrated in which the pipe 10 has a threaded opening 16 for mounting a corporation plug cock 17 having a body 18, and rotatable plug 19 with an opening 20. The body 18 has a threaded opening 21 for the reception of a mounting sleeve 22, a gasket 23 preventing fluid leakage at this location. The mounting sleeve 22 has a mounting stem 24 carried therein and positioned by a gland 25. A packing 26 prevents fluid leakage at the gland 25.

The stem 24 has an elongated mounting body 27 extending therefrom, made of corrosion resistant material, with a diametrical mounting portion 28, and elongated vanes 15 and 15a with front faces 30 carried thereon, of width $w$ and preferably streamlined, in transverse cross section. The vanes 15 and 15a, two being shown by way of illustration have mounting arms 31 extending therefrom into a mounting block 32. The rear wall 33 of the mounting portion 28 is preferably shaped to facilitate velocity recovery and thereby reduce pressure loss.

The arm 31 of the vane 15 has resistance strain gauges 34 and 35 cemented thereto and the arm 31 of the vane 15a has resistance strain gauges 36 and 37 cemented thereto.

Forces from the flowing fluid acting on the vanes 15 and 15a put the strain gauges 34 and 37 in compression while the strain guages 35 and 36 are in tension. The two tension gauges 35 and 36 are connected in series by conductor 38 and the two compression gauges 34 and 37 are connected in series by conductor 39 thus adding their effects. The four gauges 34, 35, 36, and 37 together form one side of resistance bridge 40.

This disposition of the vanes 15 and 15a and the gauges 34, 35, 36 and 37 is desirable because it locates the neutral axis of arms 31 on a pipe diameter and thus makes the true radius to any impact force acting on vanes 15 and 15a the lever arm of that force. It also insures that all sections of the arms 31 have the same value of bending moment so that all portions of the gauges 34, 35, 36 and 37 are equally strained and fully effective.

Figure 6:
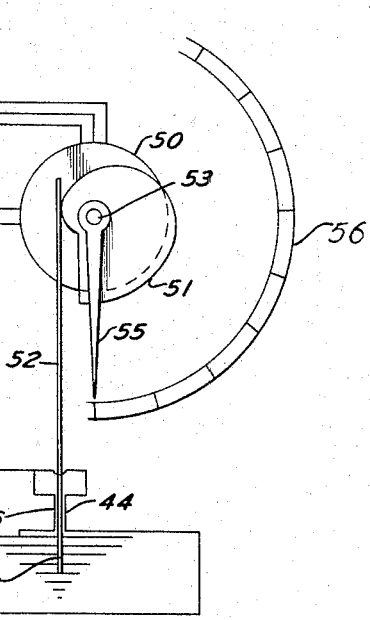
FIG. 6 is a diagrammatic view of a control circuit for use in connection with the invention.

The bridge 40, is shown in FIG. 6, is preferably included in a circuit one leg of which, such as that having the gauge 34, is connected to ground by a conductor 41. Another leg, such as that having the gauge 36, is connected by a conductor 42 through a zero adjusting resistance 43 and strain gauge 44. An alternating current voltage source 45, such as a 6 volt source at 60 cycles, is impressed across the bridge through a strain gauge 46.

An amplifier 47 is provided to receive a signal which favors the positive or negative side of the A.C. cycle, depending on the direction of the unbalance of the bridge 40. The amplifier output stage is phase selective and drives a reversing motor 50 connected to a cam 51 on a pointer shaft 53. The cam 51 acts on an elastic spline 52 carried in a mounting 54 and on opposite sides of which are cemented strain gauges 44 and 46. The bending of the spline 52 changes the ratio of the gauges 44 and 46 to restore the balance of the bridge 40. Since the forces on sensing vanes 15 and 15a are proportional to the squares of the velocities, the cam 51 is preferably a square root cam in order that a pointer 55 on the motor shaft 53 may indicate rate of flow, on a scale 56 of uniform divisions. In practice the two sides of the bridge 40 may be separated a considerable distance, since one half including the gauges 34, 35, 36 and 37 is inside the pipe 10, and the other half is in the instrument box (not shown). Since all the gauges of either half of the bridge 40 are under the same ambient conditions, temperature effects should be cancelled out.

In operation, therefore, the vanes 15 and 15a each provides an averaging effect for the portion of the flow to which it is exposed and has its moments, with the moment center inside the pipe 10 and together they provide an averaging effect for unsymmetrical velocity fronts. The vane mounting hinge 31 preferably at the center of flow and along a radius of the pipe 10 provides a lever arm for the force from which a signal is available for utilization for indication, recording and for control.

The vane meter can be readily separated from its mounting on the pipe 10 by separating the sleeve 22 at its threaded connection 21, removing the same, and the valve plug 19 turned to closed position.

The vane meter can be installed or reinstalled in any desired cock 17.

It will thus be seen that simple but effective apparatus is provided for carrying out the objects of the invention.

I claim:

1. A vane type flow meter for installation in a pipe comprising
  a mounting member for disposition transversely in a pipe,
  vane means diametrically disposed and extending substantially across the interior of the pipe and being diametrically elongated and exposed to the fluid flow in the pipe,
  resilient hinge mounting means for said vane means connected to said mounting member and disposed at the center of the pipe, and
  a force responsive take-off member connected to said hinge mounting means,
  said vane means having a plurality of diametrically aligned vanes, and
  said hinge mounting means including a hinge for each of said vanes.

2. A vane type flow meter for installation in a pipe comprising
  a mounting member for disposition transversely in a pipe,
  vane means diametrically disposed and extending substantially across the interior of the pipe and being diametrically elongated and exposed to the fluid flow in the pipe,
  resilient hinge mounting means for said vane means connected to said mounting member and disposed at the center of the pipe, and
  a force responsive take-off member connected to said hinge mounting means,
  said force responsive take-off member including a strain gage member carried by each of said hinges, and
  said strain gage members being connected additively.

3. A vane type flow meter for installation in a pipe comprising
  a mounting member for disposition transversely in a pipe,
  vane means diametrically disposed and extending substantially across the interior of the pipe and being diametrically elongated and exposed to the fluid flow in the pipe,
  resilient hinge mounting means for said vane means connected to said mounting member and disposed at the center of the pipe, and
  a force responsive take-off member connected to said hinge mounting means,
  said force responsive take-off member including a take-off device for each hinge,
  signal responsive members being provided to which said take-off device are connected,
  said signal responsive members having a driving member connected thereto, and
  a square root extracting member being connected to said driving member.

References Cited by the Examiner

UNITED STATES PATENTS

| 384,570 | 6/1888 | Grovesteen et al. | 200—81.9 |
| 2,683,369 | 7/1954 | Brewer | 73—228 |
| 2,805,574 | 9/1957 | Jackson et al. | 73—228 |
| 3,147,620 | 9/1964 | Stapler | 73—228 |
| 3,175,399 | 3/1965 | Medlar | 72—228 X |

FOREIGN PATENTS

| 687,354 | 1/1940 | Germany. |
| 451,295 | 8/1936 | Great Britain. |

RICHARD C. QUEISSER, *Primary Examiner.*
EDWARD D. GILHOOLY, *Assistant Examiner.*